United States Patent [19]

Tausend

[11] Patent Number: 4,475,639
[45] Date of Patent: Oct. 9, 1984

[54] CLUTCH ASSEMBLY FOR GEAR TRANSMISSION

[75] Inventor: Erich Tausend, Senden, Fed. Rep. of Germany

[73] Assignee: Zahnradfabrik Friedrichshafen Aktiengesellschaft, Friedrichshafen, Fed. Rep. of Germany

[21] Appl. No.: 391,868

[22] Filed: Jun. 24, 1982

[30] Foreign Application Priority Data

Jun. 27, 1981 [DE] Fed. Rep. of Germany ....... 3125424

[51] Int. Cl.³ ............................................. F16D 23/08
[52] U.S. Cl. .................................. 192/53 G; 74/339; 192/53 F; 192/111 A
[58] Field of Search ................ 192/53 G, 53 E, 53 F, 192/48.91, 70.25, 111 A; 74/339

[56] References Cited

U.S. PATENT DOCUMENTS

| | | | |
|---|---|---|---|
| 1,901,712 | 3/1933 | Christman | 74/339 X |
| 1,901,713 | 3/1933 | Vincent | 192/53 F |
| 2,187,967 | 1/1940 | Fawick | 192/53 E X |
| 2,397,943 | 4/1946 | Bull | 192/53 F |
| 4,349,090 | 9/1982 | Griesser | 192/53 F X |
| 4,349,091 | 9/1982 | Miyake et al. | 192/53 F |

FOREIGN PATENT DOCUMENTS 2915965 10/1980 Fed. Rep. of Germany.

Primary Examiner—Rodney H. Bonck
Attorney, Agent, or Firm—Karl F. Ross

[57] ABSTRACT

A driving gear having external teeth in mesh with internal teeth of a sliding sleeve, adapted to be axially shifted into meshing engagement with external teeth of a driven gear coaxially adjoining the driving gear, carries several peripherally spaced rockers which project radially into axially extending inner peripheral guide grooves of the sleeve. A synchro ring coaxial with the two gears is rotationally entrained by the driving gear, through the intermediary of the rockers thereof, and has a clutch surface confronting a similar surface of the driven gear across a narrow clearance which closes when the ring, under an axial thrust from the rockers in response to an incipient coupling shift of the sleeve, is moved toward the driven gear. As long as a speed difference exists between the two gears, the synchro ring exerts upon the rockers a peripheral force which urges them into lateral pockets of the respective guide grooves so as to prevent a completion of the coupling shift until synchronism has been established. The driven gear and the synchro ring may be duplicated on opposite sides of the driving gear and the sleeve.

12 Claims, 10 Drawing Figures

CLUTCH ASSEMBLY FOR GEAR TRANSMISSION

FIELD OF THE INVENTION

My present invention relates to a clutch assembly for an automotive or other transmission system in which a pair of coaxial gears, one of which may be at rest, can be positively interconnected for joint rotation by an internally toothed sleeve meshing only with one gear in a decoupling position but engaging the teeth of both gears in a coupling position into which it is slidable after the two gears have been synchronized, i.e. are rotating at the same speed (which in certain cases could even be zero).

BACKGROUND OF THE INVENTION

A clutch assembly of this type is the subject matter of commonly owned applications Ser. No. 141,150 now U.S. Pat. No. 4,349,090 and Ser. No. 312,129 (now U.S. Pat. No. 4,425,990) filed, respectively, Apr. 17, 1980 and Oct. 16, 1981 by Walter Griesser. According to the disclosures of these pending applications, an externally toothed first (e.g. driving) gear carries several peripherally spaced spring-loaded detent members or rockers which extend radially into an inner peripheral groove of the internally toothed coupling sleeve while the latter is in a decoupling position, i.e. is disengaged from a coaxially adjoining second (e.g. driven) gear having external teeth of the same diameter and pitch. Upon an incipient coupling shift of the sleeve, i.e. an axial displacement thereof toward the second gear, the rockers exert an axial thrust upon a synchro ring which is limitedly rotatable relatively to the first gear and has a clutch surface confronting a similar surface of the second gear across a narrow clearance. As that clearance is eliminated by the thrust, the synchro ring is frictionally coupled with the second gear and is limitedly rotated, relatively to the first gear, about the common gear axis. This relative rotation, in a direction dependent on the speed difference between the two gears, causes each rocker to come to rest against one of two bracketing projections on the synchro ring so as to prevent a radial inward displacement of the rockers by camming engagement with the sleeve until the speed difference between the two gears has been substantially eliminated. It is only then that the sleeve can cam the rockers radially inward to complete the coupling shift.

The rocker members of the described clutch assembly act as levers whose mechanical advantage amplifiers the exerted gear-shifting force as transmitted to the coacting clutch surfaces of the synchro ring and the second gear. This mechanical advantage enables a significant acceleration of the coupling shift since the times t for completing that shift is given by $$F_a = \frac{J \cdot \Delta\omega \cdot k}{t}$$

where J is the mass moment of inertia of the rotating parts whose speed is to be changed, $\Delta\omega$ represents the difference in the rotary speeds of the two gears and k is a proportionality factor. The effective increase in the exerted axial force $F_a$ is particularly useful for the shifting of gears in heavy-duty vehicles, such as trucks or tractors, which in many instances are still being shifted manually.

Certain shortcomings of that prior clutch assembly, however, call for further improvement. Thus, the axial thrust exerted upon the synchro ring in the initial phase of a coupling shift is transmitted via beveled surfaces of the sleeve and the rockers giving rise to additional resistance components that must be overcome. The frictional resistance increases with the leverage and may cause jamming even with relatively small values of the aforementioned mechanical advantage. The completion of the shift requires a radially inward depression of the rockers against the force of their biasing springs which is supplemented by the centrifugal force of the rotating first gear. Moreover, if the confronting clutch surfaces of the synchro ring and the second gear are frustoconical (they could also be formed by interleaved annular friction disks as likewise disclosed in the two prior applications), the combined radial and pivotal motion of the rockers may tend to disalign the two clutch surfaces so as to cause unsymmetrical wear.

OBJECT OF THE INVENTION

The object of my present invention, therefore, is to provide an improved clutch assembly of the general type described which obviates the aforementioned shortcomings.

SUMMARY OF THE INVENTION

I realize this object, in accordance with the present invention, by replacing the inner peripheral groove of the coupling sleeve of the earlier clutch assembly by an axially disposed inner guide groove for each detent member or rocker, the latter being universally jointed to the aforementioned first gear at a fixed fulcrum. In the decoupling position, in which the inner teeth of the sleeve are not in mesh with the outer teeth of a coaxially adjoining second gear, a free end of each detent member extends substantially radially into the respective guide groove which is provided with lateral pockets positioned to receive that free end upon a relative angular disalignment of the synchro ring and the first gear from a normal median position thereof. Owing to the fact that each detent member is positively entrainable in either peripheral direction by the synchro ring, as is also the case in the prior clutch assembly, such angular disalignment results from a speed difference between the first and second gears upon the establishment of frictional contact between the clutch surfaces of the second gear and the synchro ring by an axial thrust exerted upon the latter through the intermediary of the detent members. The lateral pockets of each guide groove are bounded by camming edges dislodging the free end of the associated detent member therefrom in response to a continuing axial thrust, upon establishment of substantial synchronism between the two gears, for enabling a completion of the coupling shift.

Since the fulcrum of each detent member or rocker is fixed on the first gear, as noted above, the rockers have no radial mobility. Their free ends, however, must still be indexable on the sleeve in order to tilt upon an incipient coupling shift so as to exert the necessary axial thrust upon the synchro ring. While there are various ways of insuring the releasable coupling of these free ends with the sleeve, I prefer to provide them with spring-loaded contact elements (e.g. spheres) receivable in central depressions of the bottoms of the respective guide grooves when the sleeve is in its decoupling position. Advantageously, the bottom of each guide groove is arcuately curved about a line parallel to the gear axis which passes through the fulcrum of the respective rocker, thereby maintaining the original contact pressure when the free rocker extremity enters one of the lateral pockets. The machining of such a guide groove is simplified by forming that groove in a separate insert which is subsequently fitted into the sleeve.

The radially immovable rockers preferably are of generally cylindrical shape and provided with collars which are limitedly tiltable as well as radially slidable thereon and are biased by springs urging them outward against overhanging shoulders of the synchro ring in order to center same on the gear axis when, again as in the systems of the prior applications, several such rockers are peripherally equispaced about that axis. Such centering is particularly desirable when the clutch surfaces of the synchro ring and of the second gear are frustoconical; it should be noted, however, that my invention is also applicable to clutches of the lamellate type with interleaved annular friction disks as discussed above.

My improved clutch assembly is readily adaptable to a generally symmetrical gear transmission in which the first gear can be selectively coupled either to the second gear or to a third gear on the opposite side thereof. In such as assembly, of course, another synchro ring is to be interposed between the first and third gears for coaction with the detent members or rockers in the same manner as the synchro ring already referred to. The two synchro rings may be independent of each other but, pursuant to a further advantageous feature of my invention, could also be adjustably interconnected by a plurality of link members or yokes surrounding the respective rockers with a certain clearance, these link members having projections which yieldably engage respective sawteeth on serrated inner peripheral surfaces of these rings. Other sawteeth of the serrated surfaces are engaged by coating formations of the spring-loaded rocker collars for the transmission of the axial thrusts which close the gap between the corresponding clutch surfaces during an incipient coupling shift; when these clutch surfaces have become worn sufficiently to increase the axial stroke of the collars by one sawtooth pitch, the projections on the link member maintain the increased separation of the synchro rings after the rockers are retracted into their normal radial position or are tilted in the opposite direction. This insures a progressive increase in the axial separation of the synchro rings to compensate for the wear of the clutch surfaces.

BRIEF DESCRIPTION OF THE DRAWING

The above and other features of my invention will now be described in detail with reference to the accompanying drawing in which.

SPECIFIC DESCRIPTION

Figure 1:
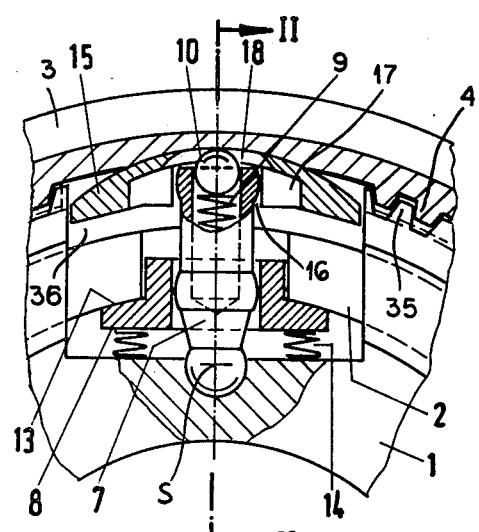
FIG. 1 is a fragmentary cross-sectional view of a clutch assembly embodying the invention.

Reference will first be made to FIGS. 1–4 showing part of an automotive transmission with a driving gear 1 clamped between peripheral shoulders of two threadedly interconnected shafts 31 and 32 for rotary entrainment thereby. Two other gears $Z_1$, $Z_2$ are shown to idle in axially fixed positions on shafts 31 and 32 on which they are supported by respective roller bearings 33 and 34. The two gears $Z_1$ and $Z_2$, which are to be selectively coupled with gear 1 for joint rotation with the aid of an axially shiftable sleeve 3, are virtually identical and symmetrical with reference to gear 1; they further coact with respective synchro rings 2 and 102 which are also symmetrically disposed about a plane of rotation P. I shall therefore refer in the following description mainly to gear $Z_1$ and to the associated synchro ring 2.

Figure 10:
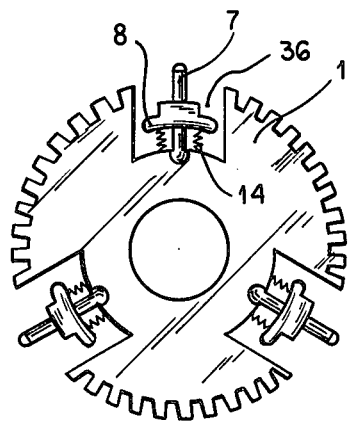
FIG. 10 is a face view of a driving gear included in the assembly of FIGS. 1 and 2, showing a plurality of peripherally equispaced rockers.

Sleeve 3 has an outer peripheral groove 30 engageable by the usual shift fork (not shown) and further has a set of internal teeth 4 adapted mesh with external teeth 6 of gear $Z_1$ or with corresponding teeth of gear $Z_2$. These teeth 4 are also in permanent mesh with external teeth 35 of gear 1 which are of the same diameter and pitch as teeth 6. The annular array of teeth 35 is interrupted at three peripherally equispaced locations where an insert 15 is fitted into the inner sleeve surface, this insert being partly received in a peripheral cutout 36 of gear 1. The three cutouts 36 confronting the respective inserts 15 have been illustrated in FIG. 10.

Figure 4:
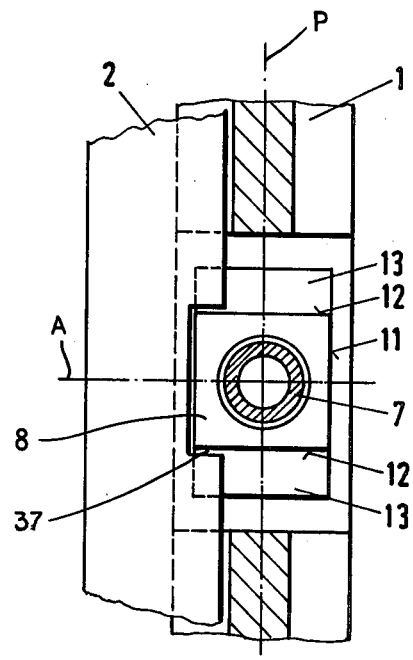
FIG. 4 is a fragmentary view (partly in section) of some of the elements of the assembly of FIGS. 1 and 2 as seen in a radial direction.

A detent member in the form of a generally cylindrical rocker 7 is universally jointed to gear 1 within each cutout 36 for swinging about a fixed fulcrum S. In the decoupling position illustrated in FIGS. 1 and 2, rocker 7 is radially oriented in the plane of rotation P and has its free end aligned with a central depression 18 at the bottom of a guide groove 16 of insert 15 which extends in the direction of the common gear axis A. Groove 16 is provided with two lateral pockets bounded by camming edges 17 which include an angle $\phi$ with the plane of rotation P. A ball 10 received in a bore of rocker 7 protrudes from its free end and is pressed by a loading spring 9 against the bottom of groove 16 so as to be confined within depression 18 in the decoupling position referred to. Thus, an axial shift of sleeve 3 to the left or the right from that decoupling position (FIG. 2) tilts the rocker 7 in the corresponding direction. The rocker has a bulge surrounded by a radially slidable collar 8 which is partly received in a peripheral recess 37 of synchro ring 2 is best seen in FIG. 4. The opposite synchro ring 102 has, of course, a similar recess embracing a portion of collar 8. This collar has a head of substantially square outline, bounded by peripherally extending side faces 11 and axially extending pressure faces 12, and a rectangular base projecting beyond that head in the peripheral direction; a pair of curved surfaces 13 of that base are overhung by respective shoulders of synchro ring 2 (and of its companion ring 102) as best seen in FIG. 1. The collar 8 of each rocker 7 is urged radially outward by a surrounding spring 14 so as to center the two synchro rings on the gear axis A; these shoulders terminate at flanks of recess 37 confronting the pressure faces 12. A frustoconical inner clutch surface 38 of ring 2 is thereby held spaced by a narrow annular gap from a confronting outer clutch surface 5 of gear $Z_1$ in the decoupling position of FIG. 2.

Figure 2:
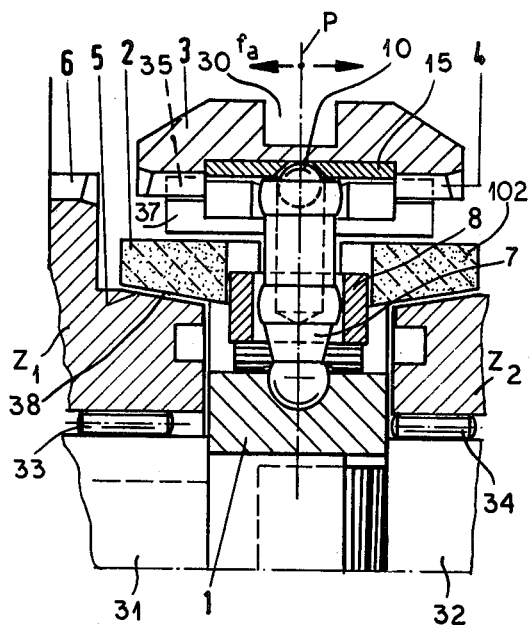
FIG. 2 is a fragmentary sectional view taken on the line II—II of FIG. 1.

When it is desired to couple the driving gear 1 with the driven gear $Z_1$ for joint rotation, sleeve 3 is shifted leftward (arrow $f_a$) from the position of FIG. 2 whereby rocker 7 pivots counterclockwise about fulcrum S and through the intermediary of collar 8 displaces the synchro ring 2 to close the gap between clutch surfaces 5 and 38 after displacing a film of lubricating oil normally coating these surfaces; this may take about 0.01 second. Depending on the sense of relative rotation of gears 1 and $Z_1$, synchro ring 2 is frictionally entrained in one direction or the other from the median position of FIG. 1 whereby the free end of rocker 7, still indexed by the ball 10 in depression 18, is forced into one of the two lateral pockets flanked by camming edges 17. The axial thrust exerted upon synchro ring 2 by the leftward shift of sleeve 3 has been represented by an arrow labeled $F_a$ in FIG. 3; this thrust, as explained above, is amplified by the leverage of the rocker over the shifting force $f_a$ (FIG. 2) manually exerted upon the sleeve 3.

Figure 3:
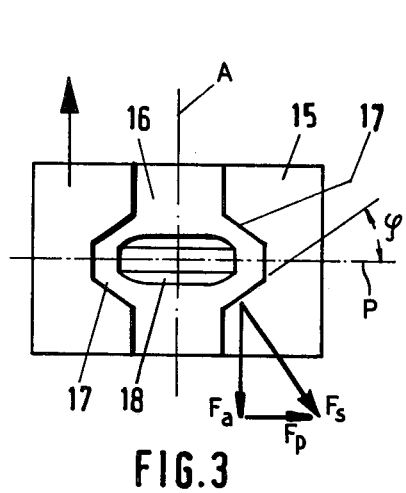
FIG. 3 is a face view of a grooved inserted of a coupling sleeve forming part of the assembly of FIGS. 1 and 2.

The peripheral force acting upon ring 2 on account of the speed difference $\Delta\omega$ between gears 1 and $Z_1$ has been designated $F_p$ in FIG. 3. This peripheral force is proportional to the axial thrust $F_a$ so that the resulting vector $F_s$ includes with the axial direction an essentially invariable angle which equals the angle of inclination $\phi$ of camming edges 17 and corresponds to the angle of friction of the clutch surfaces. Thus, the edges 17 of the groove pockets shown in FIG. 3 are perpendicular to this resulting vector $F_s$ so to transmit the entire amplified shifting force. Upon the establishment of substantial synchronism between the two gears, the tangential component $F_p$ due to the differential torque virtually disappears so that only the axial component $F_a$ remains effective. The spherically curved outer extremity of rocker 7 will thereby be cammed out of the engaged pocket and realign itself with guide groove 16, thus allowing the completion of the coupling shift which brings the teeth 4 of sleeve 3 into mesh with the teeth 6 of gear $Z_1$. These teeth 4, of course, remain partly engaged with the teeth 35 of gear 1 whereby the two gears are positively interconnected through the bridging sleeve 3. It should be noted that the final phase of the coupling shift involves only a repression of ball 10 against the relatively weak force of its loading spring 9, as the ball is cammed out of depression 18, and does not affect the biasing springs 14 of the several collars 8 by which the synchro ring 2 is centered on axis A.

Figure 5:
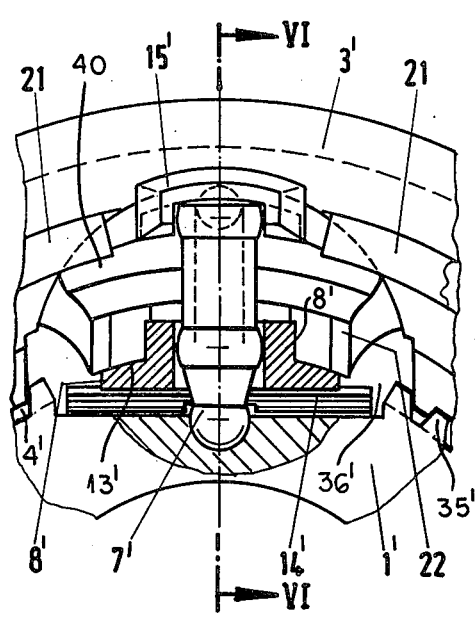
FIG. 5 is a cross-sectional view similar to that of FIG. 1 but relating to another embodiment.
Figure 6:
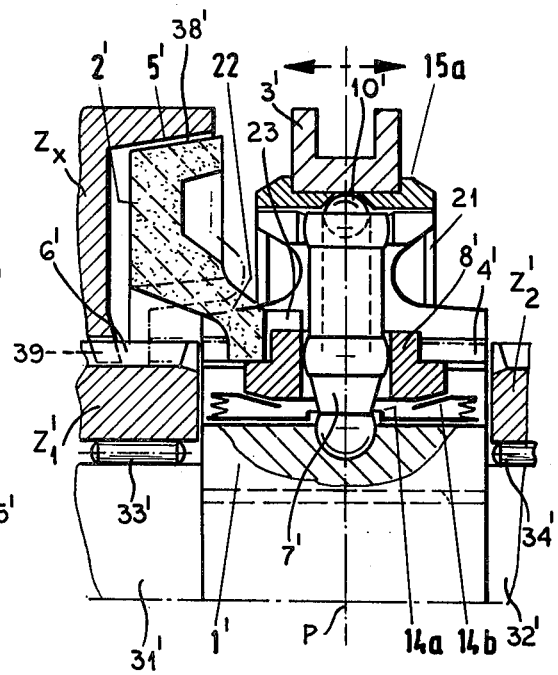
FIG. 6 is a sectional view similar to that of FIG. 2 but taken on the line VI—VI of FIG. 5.

I shall now refer to FIGS. 5 - 8 in which elements analogous to those of the preceding embodiment have been given the same reference characters supplemented by a prime mark. In this instance the two synchro rings, of which only the ring 2' to the left of gear 1' (FIGS. 6 and 8) has been illustrated, do not coact directly with the externally toothed flanking gears $Z_1'$, $Z_2'$ but have frustoconical outer clutch surfaces closely confronting similar inner surfaces on other gears serving as extensions of the two alternatively driven gears. Thus, as seen in FIG. 6, the teeth 6' of gear Z' are in mesh with inner teeth 39 of a surrounding gear $Z_x$ which has an inner peripheral clutch surface 5' confronting the clutch surface 38' of ring 2'; gear $Z_x$, of course, is axially fixed with reference to shafts 31', 32', as are the driven gears $Z_1'$, $Z_2'$. For practical purposes, therefore, gears $Z_1'$ and $Z_x$ can be regarded as a single transmission element provided with clutch surface 5' and teeth 6'.

Figure 7:
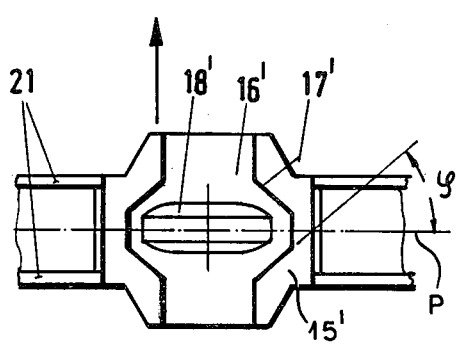
FIG. 7 and 8 are views analogous to those of FIGS. 3 and 4, again relating to the second embodiment of my invention.
Figure 8:
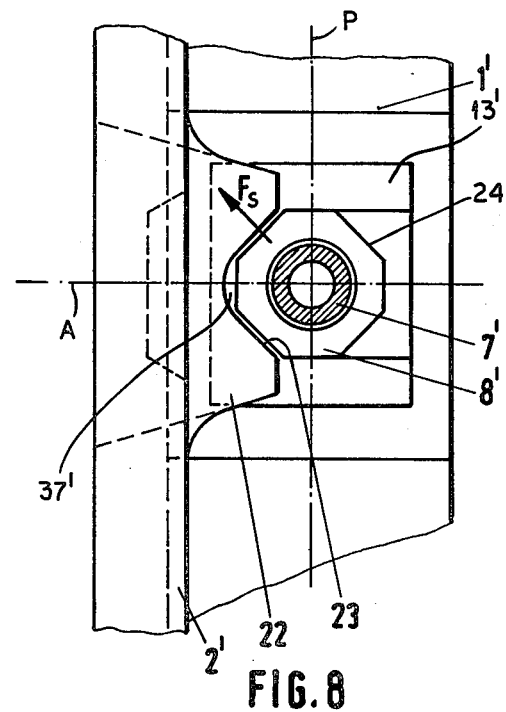

The insert 15' of coupling sleeve 3', formed with the guide groove 16' best shown in FIG. 7, has ridges 15a defining its axial position relative to sleeve 3'. The width of that insert must, of course, be sufficient to retain the sphere 10' in groove 16' over the entire shifting range of the sleeve. The angular position of insert 15' is defined by ring segments 21 of sleeve 3' bracketing that insert as best seen in FIGS. 5 and 7. Sleeve 3' is of much greater radial depth than its counterpart 3 in the preceding embodiment and has peripherally equispaced cutouts 40 confronting the considerably shallower cutouts 36' of gear 1'. Synchro ring 2' has claws 22 which partly reach around the heads of collars 8' slidably surrounding each rocker 7', these collars being here biased radially outward by leaf springs 14' each having a central aperture 14a traversed by the respective rocker 7' and inbent extremities 14b forming two radially inwardly converging seating surfaces underlying the associated collar. Springs 14', therefore, tend to hold the rockers 7' in their radial position illustrated in FIGS. 5 and 6.

Each collar 8' has a head of octagonal profile and a wider base which forms the centering surfaces 13' supporting the claws 22 of synchro ring 2' and of its nonillustrated companion ring. These claws have flanks 23 which, like confronting pressure faces 24 of the octagonal collar head, are codirectional with the camming edges 17' of the pockets of guide groove 16' so as to be perpendicular to the resulting vector $F_s$ whose significance has been explained above. Such sloping faces could also be used on the head of collar 8 (FIG. 4), in lieu of the transverse faces 12, and the confronting flanks of the recess 37 of synchro ring 2 could be similarly inclined.

The operation of the embodiment of FIGS. 5-8 is analogous to that described with reference to the assembly of FIGS. 1-4. Clutch surfaces 5' and 38' could be conveniently replaced by interleaved sets of annular friction disks similar to those shown in FIG. 5 of commonly owned U.S. Pat. No. 4,349,090. The left-hand coupling position of sleeve 3' has been indicated in phantom lines in FIG. 6.

Figure 9:
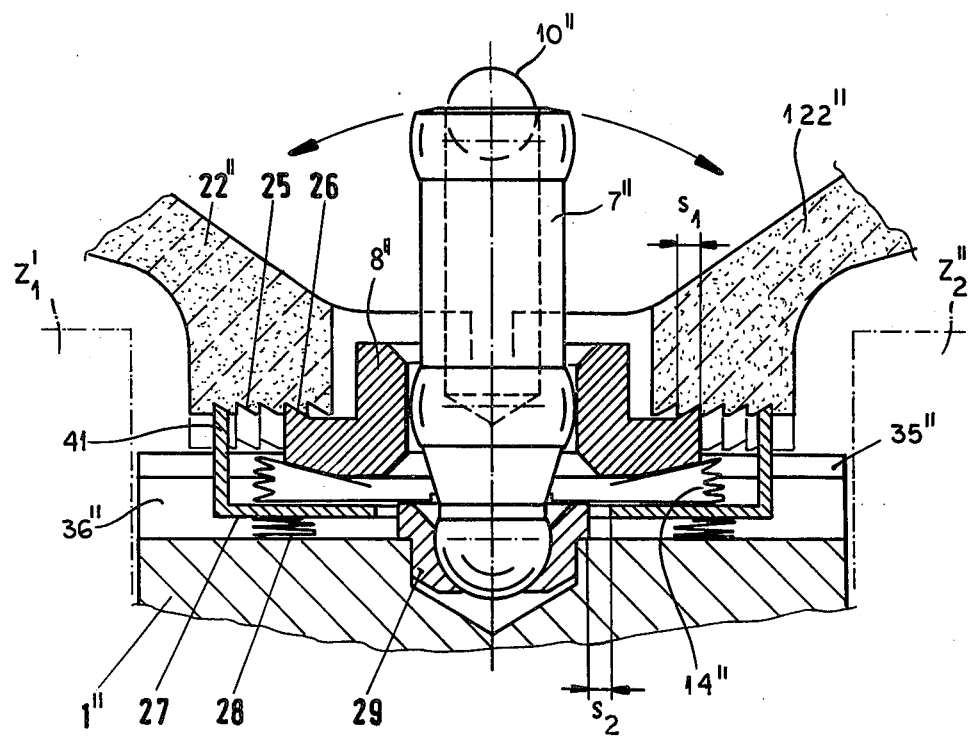
FIG. 9 is a fragmentary cross-sectional view similar to that of FIG. 6, drawn to a larger scale and showing a modification.

In FIG. 9 I have shown a modification of the assembly of FIGS. 5-8 including a driving gear 1" with teeth 35" and claws 22", 122" of two synchro rings not otherwise illustrated. Driven gears $Z_1''$ and $Z_2''$ bracketing the gear 1" have been indicated only by phantom outlines and the coupling sleeve indexably engaged by the spring-loaded contact ball 10" of a rocker 7" has been omitted.

The two claws 22", 122" have serrated inner peripheral surfaces with sawteeth 25 engaged on the one hand by coacting teeth 26 of a modified collar 8" and on the other hand by sawtooth-shaped projections 41 of a link member 27 designed as a yoke spacedly embracing that collar. Sawteeth 25 have a pitch $s_1$ which may equal about 0.1 to 0.2 mm and is slightly less than the width $s_2$ of an annular clearance with which a peripherally flanged socket 29 is received in a central aperture of cage 27; rocker 7" is universally jointed in socket 29 and is again cradled on a leaf spring 14" which has the same centering function as spring 14' of FIGS. 5 and 7 while biasing the collar 8" radially outward. A separate spring 28 (which could be of similar configuration) independently supports the yoke 27 in the associated cutout 36"

of gear 1″, the latter spring enabling a disengagement of serrations 25 from teeth 41 when one or the other synchro ring is axially shifted by the corresponding teeth 26 of collar 8″ to an extent exceeding the pitch $s_1$. Normally, such an axial shift will account for only a fraction of that pitch so that the teeth 26 of collar 8″ will remain in mesh with the engaged sawteeth 25 of both claws 22″, 122″ upon a tilt of rocker 7″ in either direction. When, however, the clutch surfaces of one of these synchro rings and the adjoining driven gear are worn down to such an extent that the stroke of collar 8″ exceeds the pitch $s_1$, the corresponding retaining tooth 41 of cage 27 snaps into engagement with an adjoining sawtooth 25 so as to backstop the respective claw; this maintains the increased axial separation of the two claws 22″, 122″ and of their respective synchro rings.

The cone angle of clutch surfaces 5, 38 (FIG. 2) or 5′, 38′ (FIG. 6) may be increased in my improved assembly over the value of 6° or 7° usually employed with frustoconical clutch surfaces of conventional systems; this facilitates the separation of the clutch surfaces upon decoupling and further improves the gear-shifting characteristic of the assembly. It may also be pointed out that the radial pressure exerted by biasing springs 14, 14′ or 14″ upon the synchro rings serves to maintain close contact between the engaged frustoconical clutch surfaces in the coupling position and eliminates the flutter or rattling sometimes encountered with such synchro rings.

The force-amplification ratio $F_a:f_a$ afforded by the disclosed dentent members or rockers can be made as large as desired, e.g. equal to or greater than 5:1. The utilization of an external clutch surface 5′ on the synchro ring, as shown in FIG. 6, increases the available surface area without enlargement of the overall volume and thus helps further reduce the force needed to establish a given frictional torque. This intensification is particularly advantageous in utility vehicles by reducing the stress exerted upon and the wear undergone by shift levers, forks, joints and other parts of the transmission. Such clutch assemblies could also be used in transmissions shiftable under load, e.g. as initial-stage or final-stage gear shifters.

I claim:

1. In a gear transmission having a first gear, a second gear coaxial with said first gear, said gears being provided with respective sets of external teeth of like pitch and diameter, and an internally toothed sleeve meshing only with the teeth of said first gear in a decoupling position, said sleeve being axially slidable into a coupling position in which it meshes with the teeth of said first and second gears for positively connecting same to each other, the combination therewith of a synchro ring coaxially interposed between said gears with freedom of limited rotation relative to said first gear, said synchro ring and said second gear being provided with confronting clutch surfaces separated by a small clearance from each other in the decoupling position of said sleeve, a detent member universally jointed to said first gear, a free end of said detent member extending substantially radially into an axially disposed inner guide groove of said sleeve in said decoupling position while being positively entrainable by said synchro ring in either peripheral direction, said guide groove being provided with lateral pockets to receive the free end of said detent member upon a relative angular disalignment of said synchro ring and said first gear from a normal median position, such disalignment resulting from a speed difference between said first and second gears upon the establishment of frictional contact between said clutch surfaces by an axial thrust exerted upon said synchro ring via said detent member whose free end is indexable on said sleeve for peripheral entrainment thereby upon an incipient axial coupling shift thereof, said lateral pockets being bounded by camming edges dislodging said free end therefrom in response to a continuing axial thrust upon establishment of substantial synchronism between said gears for enabling a completion of said coupling shift.

2. The combination defined in claim 1 wherein said detent member has a fixed fulcrum and is provided at said free end with a spring-loaded contact element frictionally engaging a depression in the bottom of said guide groove in said decoupling position.

3. The combination defined in claim 2 wherein said contact element is a sphere.

4. The combination defined in claim 1, 2 or 3 wherein said sleeve is provided with an insert forming said guide groove and said lateral pockets.

5. The combination defined in claim 4 wherein said insert is arcuately curved along the bottom of said guide groove about a line parallel to the gear axis passing through said fulcrum.

6. The combination defined in claim 1, 2 or 3 wherein said detent member is one of a plurality of identical, generally cylindrical rockers peripherally equispaced about the gear axis and received in respective cutouts of said first gear, said rockers being surrounded by respective radially slidable collars urged radially outward by biasing springs against overhanging shoulders of said synchro ring for holding same centered on said gear axis, said collars engaging in respective peripheral recesses of said synchro ring.

7. The combination defined in claim 6 wherein said collars have pressure faces confronting flanks of said recesses, said pressure faces and said flanks being inclined to the plane of rotation of the gears at angles substantially corresponding to the angle of friction of said clutch surfaces.

8. The combination defined in claim 6 wherein said biasing springs form radially inwardly converging seating surfaces exerting a centering force upon said rockers.

9. The combination defined in claim 6 wherein said first gear is disposed between said second gear and a third gear coaxial therewith for selective coupling to either of them by said sleeve, further comprising another synchro ring interposed between said first and third gears for frictional engagement with said third gear via confronting clutch surfaces and for peripheral entrainment of said rockers by way of said collars.

10. The combination defined in claim 9 wherein said synchro rings have serrated inner peripheral surfaces with sawteeth engaged by coacting formations of said collars, further comprising a plurality of link members respectively surrounding said rockers, said link members having projections yieldably engaging other sawteeth of said serrated surfaces for enabling a progressive increase in the axial separation of said synchro rings by thrusts of said collars upon a wearing of said clutch surfaces.

11. The combination defined in claim 10 wherein said rockers are pivotally mounted in sockets carried by said first gear, said link members having central apertures penetrated by said sockets with clearances along the axis of rotation exceeding the spacing of adjacent sawteeth on said inner surfaces.

12. The combination defined in claim 1, 2 or 3 wherein said camming edges are inclined to said pivotal axis at an angle substantially corresponding to the angle of friction of said clutch surfaces.

* * * * *